May 10, 1960     E. L. SILLCOX ET AL     2,936,328
BATTERY SEPARATOR AND METHOD OF MAKING SAME

Filed Feb. 26, 1958     2 Sheets-Sheet 1

INVENTORS
EDWARD L. SILLCOX
HARRY S. WITT
BY
Robert J. Patterson
ATTORNEY

2,936,328
BATTERY SEPARATOR AND METHOD OF MAKING SAME

Edward L. Sillcox, Cedar Grove, and Harry S. Witt, East Paterson, N.J., assignors to United States Rubber Company, New York, N.Y., a corporation of New Jersey Application February 26, 1958, Serial No. 718,110

7 Claims. (Cl. 136—145)

This invention relates to improvements in battery separators of the resin-bonded cellulosic fibrous sheet type and the method of making the same. Broadly, the separator of our invention is composed of a porous, resin-impregnated, felted cellulosic sheet having porous ribs composed of vinyl resin and porous filler and characterized by low electrical resistivity.

At the present time the largest single use for microporous sheets of electrical insulating materials is as separators between the plates in storage batteries for automotive vehicles. For the lead-acid type of storage battery experience has proven that battery plate separators are best provided with a ribbed profile.

In many of the separators in use today the ribs comprise thicker sections of the same material constituting the separators and are an integral part of the separator structure. A principal exception is the resin-bonded felted cellulosic fibrous sheet type of separator such as that described in U.S. Patents 2,662,106 and 2,662,107 to Uhlig et al. This type of separator is nearly always constructed with a so-called embossed, or corrugated rib formation. The material of the rib portions is of the same thickness as the plain web areas, and the ribs often have a curved transverse contour merging smoothly with the plain web portions of the sheet. The opposite face of the sheet has corresponding indentations or depressions. The corrugated type of separator does not have the ruggedness of other types.

Attempts have been made to improve the ruggedness of the corrugated separator by the application of additional resin on the rib areas. However, it has been found that such use of additional resin does not completely correct the inherent lack of ruggedness of the corrugated rib structure, and it has further disadvantages in that it increases the electrical resistance of the separator.

The principal object of the present invention is to improve the ruggedness of the resin-bonded, felted cellulosic fibrous sheet type of separator and at the same time to retain substantially all of the present desirable features of that separator, and to provide a practical process of making the improved separator of our invention. Another object is to provide a separator which overcomes the disadvantages of corrugated ribs. Numerous other objects will more fully appear hereinafter.

Figure 1:
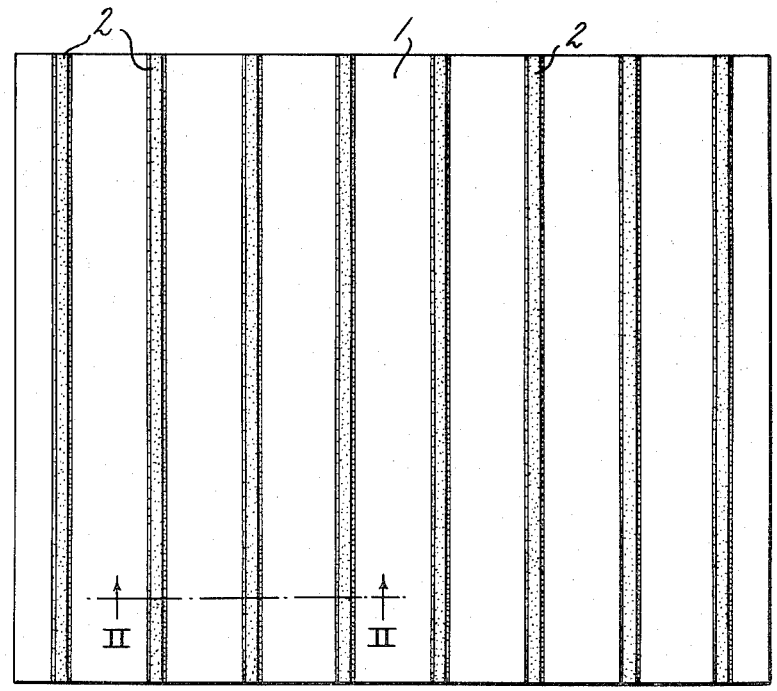
Fig. 1 is a plan view of a separator made in accordance with our invention.

Our invention is based upon the discovery that the foregoing objects can be attained by the application of relatively thick, porous ribs to a sheet of resin-impregnated, highly porous, felted cellulosic fibrous material. We have found that the resulting product has the physical and electrical properties required of separators for lead-acid electrical storage batteries and is more rugged than separators made from other sheet material but provided only with corrugations. The separators of our invention have good resistance to the chemical oxidative process and the physical abrasion encountered in the operation of electrical storage batteries, good dimensional stability, and a high degree of porosity, with the result that they achieve low electrical resistance and maximum electrolyte volume in the cell.

The product of our invention is a resin-bonded, felted cellulosic fibrous sheet having tenaciously self-adhered thereto spaced porous reinforcing ribs consisting of a continuous matrix of vinyl resin material permeated throughout with minute, interconnected pores containing particles of a porous filler, which filler is inert to battery acid. The ribs are formed on the sheet by application of rib-forming paste material to the resin-impregnated cellulosic sheet, preferably prior to final curing of the resin in the sheet. Because of the presence of water-saturated, porous filler particles in the rib-forming composition, as described below, the ribs in the finished separator have a high porosity so that they are highly permeable to the battery acid and do not significantly add to the electrical resistance of the separator. The continuous matrix of our rib structure is composed of vinyl resin, which resin is resistant to battery acid. By vinyl resin we mean polyvinyl chloride, thermoplastic copolymers of a major proportion, say 80–95%, of vinyl chloride and a minor proportion, say 20–5%, of a copolymerizable monomer such as vinyl acetate, diethyl maleate, vinylidine chloride, etc. Our vinyl resin has the desirable property of becoming coherent, i.e., forming a continuous structure, throughout the mass in the final heating step. Further, the continuous vinyl matrix thus formed is flexible so that the ribs are not brittle. We obtain flexibility by using a plasticized vinyl resin, which may be in the form of a plastisol, i.e., a suspension of resin particles in an organic plasticizer in which the resin is only slightly soluble at normal atmospheric temperatures but is much more soluble at much higher temperatures. As is well known, the plastisol is transformed into a flexible plastic material upon being heated to a suitably elevated temperature and then being cooled to room temperature.

We find that to produce a satisfactory rib structure the resin used for the continuous matrix must be a vinyl resin. Attempts to use a thermosetting resin system such as a phenol-aldehyde resin were not very satisfactory because the resultant ribs were rough in appearance. Further, after curing the ribs were very brittle so that even a slight flexing of the finished separator caused the rib to crack and break loose from the backing sheet. Attempts to utilize high-styrene, low-butadiene resinous copolymers (75–95% styrene and 25–5% butadiene) in latex form were similarly unsatisfactory in that the ribs were very rough and of poorly defined shape. With plasticized vinyl resin, on the other hand, the process was easily controlled, the flexibility and hardness of the cured rib was readily adjusted and controlled, the aging quality of the mixed uncured plastisol was excellent, and the finished rib was extremely well shaped.

For the filler material that is to be used in conjunction with the plasticized vinyl resin we find that any filler that is chemically inert and insoluble in battery acid and has a strong affinity for water can be used, provided the filler does not contain impurities injurious to the battery such as iron, chlorides, manganese, etc. We have found that the maximum permissible iron content in the filler is one percent. Almost invariably we use a filler material which has a hard, rigid, porous, particulate form when it is in dry form. It should be capable of absorbing a relatively large amount of water, for the water functions as a pore-forming agent. Typically the filler is capable of absorbing water in amount at least equal to its own weight and is used in water-saturated condition. We have found suitable fillers to be clay, diatomaceous earth, silica gels, barytes (barium sulfate mineral), and calcium sulfates. $CaSO_4.2H_2O$ has been found to be a preferred filler because of its chemical purity, its fineness, its water-holding ability, ease of incorporation into the plastisol, and relatively low cost.

The particle size of the filler is an important consideration. We have found that for satisfactory results 99.5% of the filler must pass through a 325 mesh screen and 100% must pass through a 200 mesh screen.

If silica gel is to be used as the filler material it can be prepared in known manner by substantially complete dehydration of gelatinous silicic acid formed by mixing dilute solutions of sodium silicate and sulfuric acid. The hydrous silica gel also can be made as described by Baty et al. Patent 2,329,322, by partial dehydration of such gelatinous silicic acid to the point where it changes to a free-flowing, friable, particulate state.

For application to the resin-impregnated cellulosic sheet the rib-forming material is first prepared in the form of a thick, viscous fluid or paste of such viscosity characteristic that a layer of this paste having the thickness of a separator rib will not be appreciably distorted under the force of its own weight.

The rib-forming paste is capable of being "set" irreversibly to a permanently non-flowing state by a short heating at a very high temperature. This characteristic enables the continuous production of ribbed battery separator sheets in accordance with our invention without the use of any molds, grooved liners, or other means, such as are necessary in previous processes, for maintaining the contour of the ribs during the setting and curing. The heating to "set" the ribs is done while the ribs are unconfined, i.e., no positive mechanical pressure is applied to the material of the ribs during the heating. The heating may conveniently be effected in air at atmospheric pressure. Thus, by our process, it is not necessary to cure the separator sheet under water or in any other non-evaporative environment.

In practicing our invention we prevent fusion of the vinyl resin to an impermeable mass, with subsequent locking of the pores in the filler particles by penetration of the resin therein, by the simple expedient of saturating the filler particles with water, if they are not already hydrous, before they are combined with the vinyl resin to form the paste. To form the filler paste we can simply mix the filler and water, with or without the addition of dispersing agents, until a paste of suitable consistency is obtained. Such pastes will usually contain from 25 to 50% of filler by volume. The rib-forming paste is then prepared by admixing the vinyl resin plastisol with the water-containing filler paste.

Those skilled in the art will be readily able in the light of the specification to prepare paste suitable for use in making ribs in accordance with our invention. The relative volume variations of plastisol, water and filler that can be tolerated and still produce a practical rib are as follows:

|  | Percent |
|---|---|
| Plastisol | 40–65 |
| Water | 30–40 |
| Fillers | 2.5–25 |

The proportions should be such that the final ribs have the highest porosity consistent with the ruggedness desired.

After the paste of vinyl resin and filler has been prepared it is deposited on the resin-impregnated cellulosic fibrous sheet stock as ridges, ribbons or ribs having the desired dimensions, contour and spacing. Suitable methods include: extrusion from orifices having the shape of the desired ribs; spreading by means of a bar or a blade of suitable shape to form the ribs; and trowelling or otherwise spreading the paste into the cut-away slotted portions of a stencil, the depth of the slots in the stencil being equal to the desired height of the ribs. We may also form ribs by depositing the paste in the grooves of a corrugated sheet, to at least partially fill the grooves in one face of the sheet.

We apply the paste ribs to the resin-impregnated cellulosic fibrous sheet wherein the resin may (or may not) have been partially set, and then subject the sheet having the rib material deposited thereon briefly to a high temperature for a sufficient time to fuse the resin in the ribs, drive out substantially all water and other volatile materials in the ribs, and complete the setting of the resin in the cellulosic sheet. This heat treatment effects coherence of the rib material and tenacious bonding of the ribs to the cured sheet constituting the body portion of the separators, so that separation of the ribs from the sheet during the life of the separators does not occur.

After the final heating step the ribbed sheet is ready to be cut or trimmed to proper length and widths for use as battery plate separators.

Preferably both the resin-impregnated cellulosic sheet and the ribs contain a wetting agent in order to facilitate penetration of the finished separator by the battery acid.

The temperature and time of heating of the sheet upon which the ribs have been deposited may vary from about 300° F. to about 500° F., with the time required varying inversely with the temperature. Thus, at 500° F. only about 90 seconds is required while at 300° F. about 15 minutes is required. Lower temperatures would require correspondingly longer times. The lowest temperature that may be selected must be sufficiently high to ensure fusion of the resin selected. Short curing periods are desirable because they not only increase the rate of production in equipment of a given size but also have the least deleterious effect upon the cellulosic sheet.

The resin impregnation of the cellulosic fibrous sheet can be carried out in any suitable manner now known to those skilled in the art. In making a phenolic-resin-impregnated sheet we may follow, for example, the teachings of Uhlig et al. 2,662,106 and 2,662,107. However, we are not restricted to using the techniques described in these Uhlig et al. patents. On the contrary, we can use the technique described in Uber 2,543,137. Alternatively, we can use the techniques described in Wilson et al. 2,591,754, Wilson et al. 2,591,755, Merrill 2,626,429 and Grangaard 2,665,221. Although we prefer that a phenol-formaldehyde resin be used in impregnating the cellulosic fibrous sheet, we are not restricted thereto but can use other suitable acid-resisting resin. When a phenol-formaldehyde resin is used it is applied to the sheet in the A-stage and is subsequently cured to the C-stage. When such phenol-formaldehyde resin is used to impregnate the cellulose sheet the resultant sheet is not overly brittle, for the resin tends to be in the form of a thin coating and, accordingly, will withstand flexing or bending.

In the practice of our invention the sheet, after saturation with the impregnating resin solution, is partially dried to a volatile content of between 5 and 20% on the wet weight basis. The rib-forming material is then applied to the sheet in the desired rib profile. The sheet is then cured and the ribs fused simultaneously in a hot air oven. The cure and fusion will take place in from 90 seconds at 500° F. to 15 minutes at 300° F. It is most convenient to run the cellulosic fibrous sheet continuously through the impregnating resin bath and squeeze rolls, thence on an endless belt through an oven where the sheet is partially dried, and then to apply the rib-forming paste and carry the ribbed sheet through the final curing oven.

Figure 2:
Fig. 2 is an enlarged sectional view on the line II—II of Fig. 1.

In the drawings, Figs. 1 and 2 portray a separator comprising a flat, resin-impregnated, felted cellulosic fibrous sheet 1 to which are adhered spaced, upstanding parallel ribs 2 made in the manner described herein.

Figure 3:
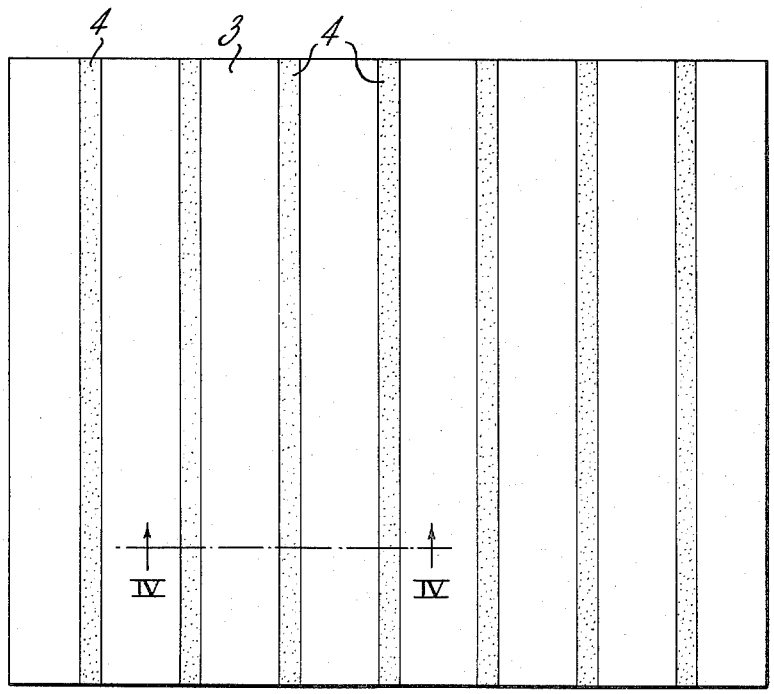
Fig. 3 is a plan view of an alternative form of separator made in accordance with our invention.
Figure 4:
Fig. 4 is an enlarged sectional view on the line IV—IV of Fig. 3.

Figs. 3 and 4 show a separator comprising a corrugated, resin-impregnated, felted cellulosic fibrous sheet 3 having the embossed depressions 4 therein filled with porous rib material in the manner described herein.

It will be understood that ribs of any desired height, cross-sectional configuration, length, and spacing can be provided.

The following examples illustrate how a battery separator embodying our invention is made. All parts are by weight.

A. Preparation of resin-impregnated cellulosic sheet

A cotton linters sheet which exhibited uniform "formation" and has a Gurley air permeability of 3 to 4 seconds and web gauge of 0.033 inch was immersed in the following solution:

| | Parts by weight |
|---|---|
| Durez 12704 (a straight phenol-formaldehyde resin dilutable in water to at least 2:1; contains 70% non-volatiles and about 26% water) [1] | 1575 |
| Isopropanol (91% alcohol, 9% water) | 706 |
| Tergitol 08 (wetting agent 45% solids, 55% water) | 25 |
| Added water | 281 |

[1] It will be seen that the A-stage phenolic resin as received from the manufacturer contained 26% water but that this water is not taken into account in calculating the relative amounts of added water and alcohol forming the solvent in which the resin is dissolved to form the impregnating solution.

This solution contained about 43% of non-volatile resin solids and about 1% of wetting agent based on actual non-volatile resin solids. The saturated sheet was squeezed so that the solution pick-up corresponded to about 26% of actual non-volatile resin solids based on dry fibers plus non-volatile resin solids. This sheet was then dried for 2 minutes to 18–24% volatiles based on net dry sheet, drying being done by air at 300° F. flowing concurrently and dropping to room temperature.

B. Preparation of hydrous filler paste (a) Anhydrous, vitreous silica gel, "Darvan" dispersing agent (sodium salt of polymerized alkyl aryl sulfonic acid), bentonite and water in the following proportions are ball-milled for 16 hours to form a paste.

| | |
|---|---|
| Silica gel | 40.0 |
| "Darvan" | 0.8 |
| Bentonite | 0.4 |
| Water | 58.8 |
| | 100.0 |

(b) Another filler paste may be made from anhydrous, vitreous silica gel which has been ball-milled with water for 16 hours. The following formulation can be used:

| | |
|---|---|
| Silica gel | 40.0 |
| Water | 60.0 |
| | 100.0 |

(c) A filler paste can be prepared from $Ca_2SO_4 \cdot 2H_2O$ as follows: Stir $Ca_2SO_4 \cdot 2H_2O$ into a slurry of bentonite, hydrous silica gel, caustic soda and water. The following formulation can be used:

| | |
|---|---|
| $Ca_2SO_4 \cdot 2H_2O$ | 260 |
| Hydrous silica gel (25% T.S.) | 47 |
| Bentonite | 17 |
| Caustic soda | 1 |
| Water | 120 |
| | 445 |

In similar fashion, a filler paste is prepared from barytes or clay from the following formulations, respectively:

(d) Barytes filler paste—

| | |
|---|---|
| Barytes | 690.0 |
| Hydrous silica gel (25% T.S.) | 47.5 |
| Bentonite | 17.0 |
| Caustic soda | 1.5 |
| Water | 220.0 |
| | 976.0 |

(e) Clay filler paste—

| | |
|---|---|
| Suprex clay | 210 |
| Water | 220 |
| | 430 |

C. Preparation of vinyl plastisol

An example of a polyvinyl chloride plastisol is the following:

| | |
|---|---|
| "Marvinol VR–50" (polyvinyl chloride) | 30 |
| "Marvinol VR–10" (polyvinyl chloride) | 70 |
| Dioctyl phthalate | 56 |
| "Paraplex G–60" (a polyester of the type shown in 37 Ind. Eng. Chem. 504 (1945)) | 14 |
| Stabilizer for polyvinyl chloride | 4 |

The foregoing ingredients are commingled at ordinary temperature to form a paste-like plastisol.

D. Preparation of rib-forming pastes

Any of the above filler pastes, such as the silica gel, $Ca_2SO_4 \cdot 2H_2O$, barytes or clay, is mixed with the vinyl resin plastisol of Example C.

The proportions of filler paste and vinyl resin plastisol will vary, depending upon which filler paste is used. Thus, if the barytes filler paste [Example B(d)] is used, it is combined as follows:

| | |
|---|---|
| Barytes filler paste | 976.0 |
| Vinyl resin plastisol [Example C] | 723.0 |

If the clay filler paste [Example B(e)] is used, the proportions are:

| | |
|---|---|
| Clay filler paste | 430 |
| Vinyl resin plastisol | 476 |

If the silica gel filler paste [Example B(a) or B(b)] is used, the proportions are:

| | |
|---|---|
| Silica gel filler paste | 39 |
| Vinyl resin plastisol | 61 |

The resultant materials are thixotropic slurries or pastes which are applied as ribs to a partially dried resin-impregnated cellulosic sheet as described above.

E. Preparation of finished separator

The $Ca_2SO_4 \cdot 2H_2O$ of Example B(c) is introduced into a mixer and the vinyl resin plastisol of Example C is added with stirring in the following proportions:

| | |
|---|---|
| $Ca_2SO_4 \cdot 2H_2O$ slurry | 445 |
| Vinyl resin plastisol | 476 |

After thorough mixing the resultant paste is transferred to the rib-forming apparatus which continuously applies the ribs to the semi-dried resin-impregnated cellulosic sheet (Example A). The ribbed sheet then enters a curing oven supported by a suitable conveyor and is cured. Curing and fusion are accomplished in 90 seconds at 500° F. or 15 minutes at 300° F.

From the foregoing it will be seen that our invention provides a simple, economical and commercially feasible method of making resin-impregnated cellulosic fibrous sheet separators having applied porous ribs. Many advantages of our invention will be immediately apparent to those skilled in the art from this specification.

This application is a continuation-in-part of our application Serial No. 433,208 filed May 28, 1954, and now abandoned.

Having thus described our invention, what we claim and desire to protect by Letters Patent is:

1. A method of making a liquid-permeable battery separator having spaced upstanding ribs tenaciously self-adhered to a flat sheet composed of a single, bibulous, resin-impregnated, felted cellulosic fibrous sheet which comprises depositing on the surface of such flat, impregnated sheet, a plurality of spaced upstanding ribs from a thixotropic paste comprising a mixture of a porous, water-saturated, particulate filler which is inert to battery acid and a resinous material comprising a plastisol of a polymer of vinyl chloride, and heating the rib sheet at a sufficiently high temperature to complete the curing of the resin in said sheet, to convert the polymer of vinyl chloride in said ribs to a coherent, permeable matrix, and to drive out the water.

2. The method of claim 1 wherein said thixotropic mixture comprises a paste of $Ca_2SO_4 \cdot 2H_2O$ and water in admixture with the plastisol of a polymer of vinyl chloride.

3. The method of claim 1 wherein said thixotropic mixture comprises a paste of silica gel and water in admixture with the plastisol of a polymer of vinyl chloride.

4. The method of claim 1 wherein said thixotropic mixture comprises a paste of clay and water in admixture with the plastisol of a polymer of vinyl chloride.

5. The method of claim 1 wherein said thixotropic mixture comprises a paste of barytes and water in admixture with the plastisol of a polymer of vinyl chloride.

6. The method of claim 1 wherein said thixotropic mixture comprises a paste of diatomaceous earth and water in admixture with the plastisol of a polymer of vinyl chloride.

7. A liquid-permeable battery separator produced by the method of claim 1.

References Cited in the file of this patent

UNITED STATES PATENTS

| | | |
|---|---|---|
| 1,937,205 | Reilly | Nov. 28, 1933 |
| 2,431,745 | Flanagan | Dec. 2, 1947 |
| 2,607,810 | Walker | Aug. 19, 1952 |
| 2,687,445 | Merrill | Aug. 24, 1954 |
| 2,772,322 | Witt et al. | Nov. 27, 1956 |